Figure 1:
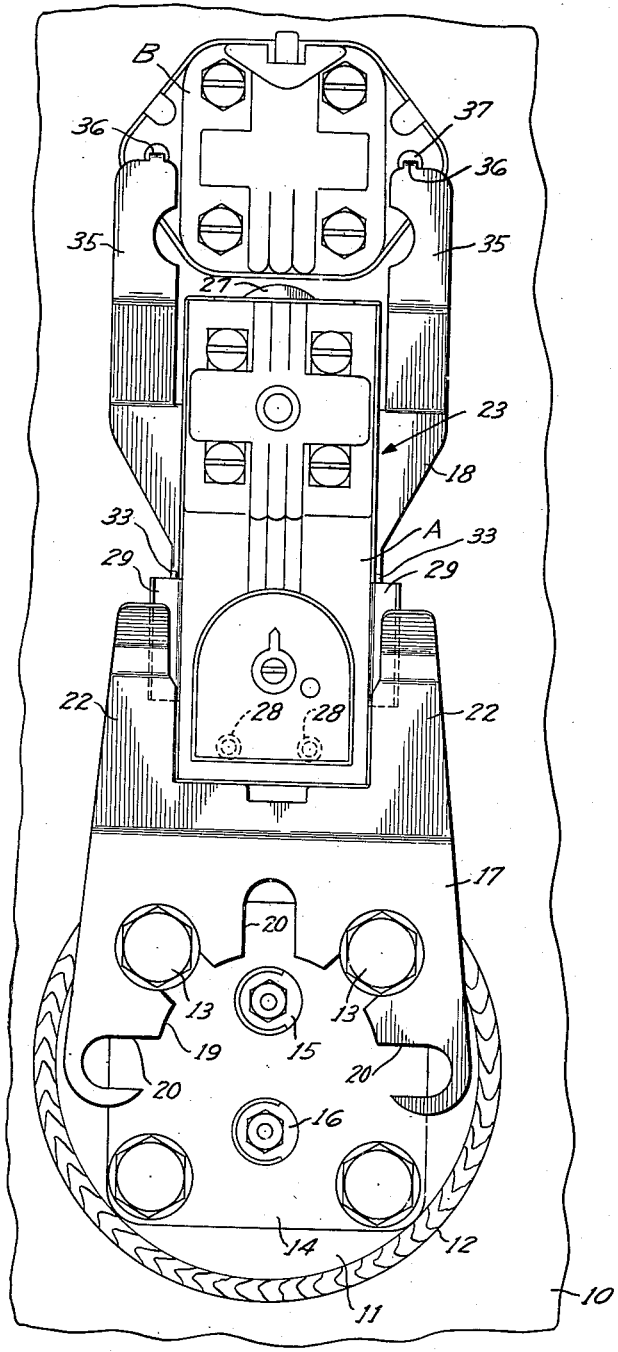

Aug. 10, 1954 J. D. BOLESKY 2,686,031
MOUNTING BRACKET FOR THERMOSTATIC SWITCHES
Filed Oct. 11, 1950 3 Sheets-Sheet 1

INVENTOR.
JOHN D. BOLESKY
BY
ATTORNEY.

Aug. 10, 1954  J. D. BOLESKY  2,686,031
MOUNTING BRACKET FOR THERMOSTATIC SWITCHES
Filed Oct. 11, 1950  3 Sheets-Sheet 2

INVENTOR.
JOHN D. BOLESKY
BY
ATTORNEY

Aug. 10, 1954     J. D. BOLESKY     2,686,031
MOUNTING BRACKET FOR THERMOSTATIC SWITCHES
Filed Oct. 11, 1950     3 Sheets-Sheet 3

INVENTOR.
JOHN D. BOLESKY
BY
ATTORNEY.

Patented Aug. 10, 1954

2,686,031

UNITED STATES PATENT OFFICE 2,686,031

MOUNTING BRACKET FOR THERMOSTATIC SWITCHES

John D. Bolesky, Mansfield, Ohio, assignor to Adrian Medert, Cleveland, and Russell W. Bolesky, Mansfield, Ohio, trustees Application October 11, 1950, Serial No. 189,557

3 Claims. (Cl. 248—205)

This invention relates to mounting brackets and more particularly to a new and improved bracket assembly for mounting or otherwise securing thermostatic switches in operative position upon the exterior surface of hot water tanks and the like.

It is among the objects of the present invention to provide a bracket assembly for mounting in operative position a plurality of thermostatic switches upon the exterior wall of a hot water tank which is exceedingly simple and inexpensive to manufacture, readily assembled and mounted and when so assembled and mounted, presents a relatively rigid and integrated structure.

Another object of the invention is to provide a bracket assembly for a plurality of thermostatic switches which may be quickly attached to a support and which bracket is so constructed that the switches may be easily mounted in and removed from the bracket thereby facilitating replacement of the switches.

A further object of the invention is to provide a bracket assembly for mounting a plurality of thermostatic switches which includes a plurality of interrelated bracket elements, each provided with a bifurcated portion for embracing and engaging a switch and arranged for securing the same on the exterior surface of a hot water tank.

A still further object of the invention is to provide a bracket assembly for mounting a plurality of thermostatic switches on the exterior wall of a hot water tank embodying means for releasably securing one of the switches with respect to the other.

A still further object of the invention is to provide a bracket for a thermostatic switch which embodies a bifurcated end portion which embraces the switch and resiliently holds the same against the wall of a hot water tank and a mounting portion which is suitably secured to the wall of the tank.

Figure 2:
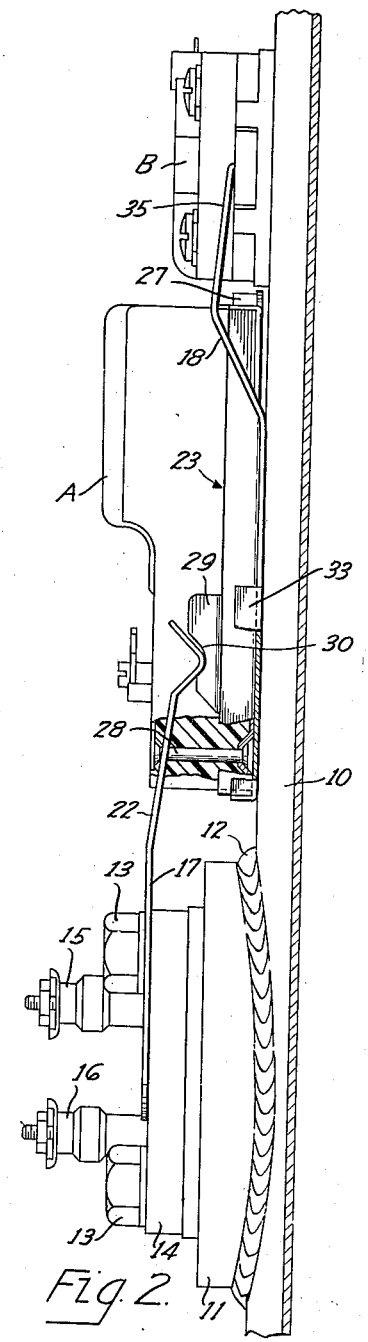
Figure 3:
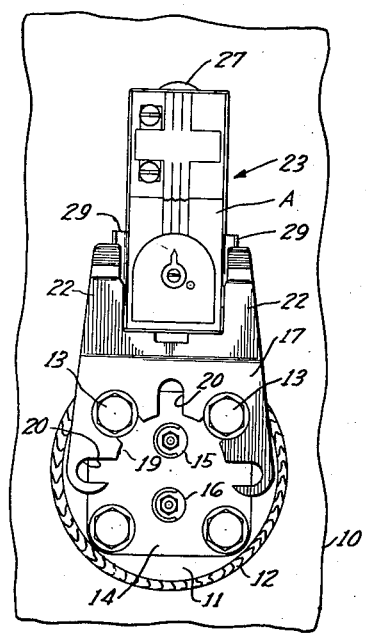
Figure 4:
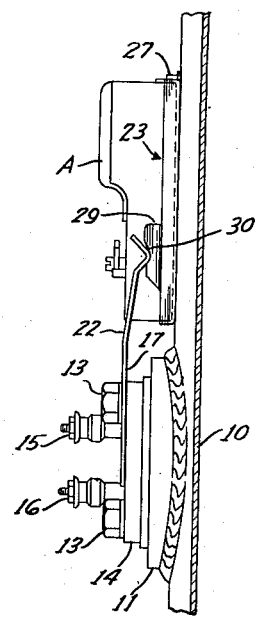
Figure 5:
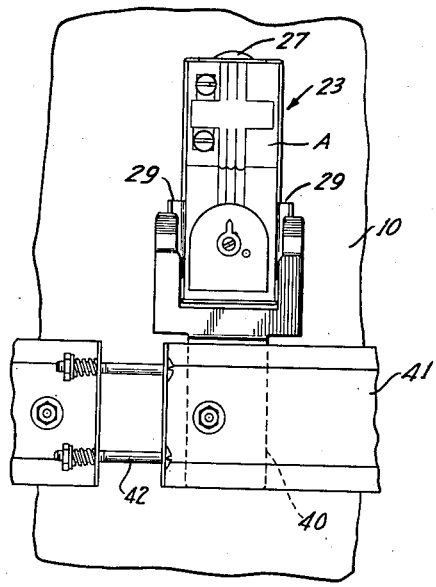
Figure 6:
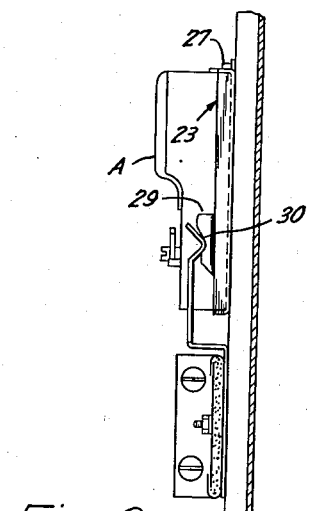
Figure 7:
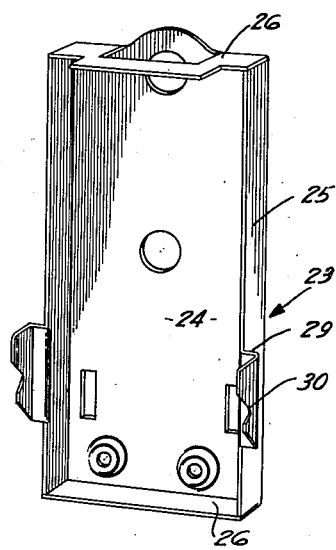

These and other objects and advantageous features of the invention not at this time more particularly pointed out will become more apparent as the nature of the invention is better understood from the following detailed description taken in conjunction with the accompanying drawings wherein like reference characters denote corresponding parts, and wherein:

Figure 1 is a front elevational view of a bracket assembly supporting a pair of thermostatic switches in accordance with this invention, in operative relation with respect to the exterior wall of a hot water tank, Figure 2 is a side elevational view, partly broken away and in section, of the bracket assembly illustrated in Figure 1, Figures 3 and 4 are front and side elevational views, respectively, of a portion of a bracket assembly employed for mounting a single thermostatic switch upon the wall of a hot water tank and wherein the bracket is received by the studs securing the electric heating element projecting into the interior of the hot water tank, Figures 5 and 6 are front and side elevational views, respectively, illustrating the bracket member of Figure 3 modified to facilitate mounting a switch on the hot water tank at a point remote from the heating element, Figure 7 is an enlarged perspective view of the casing element of the bracket assembly in which a hot water heater thermostat is mounted.

Figure 8:
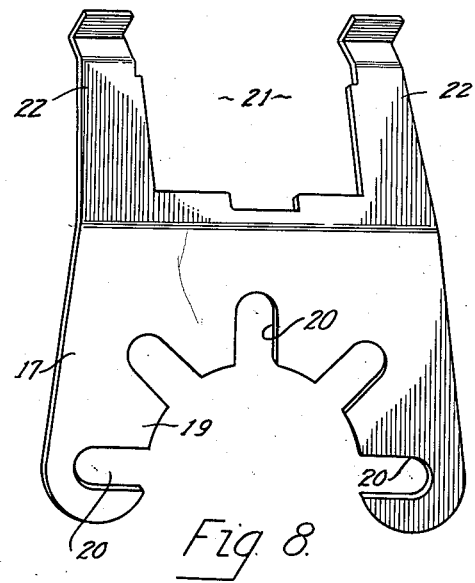
Figure 9:
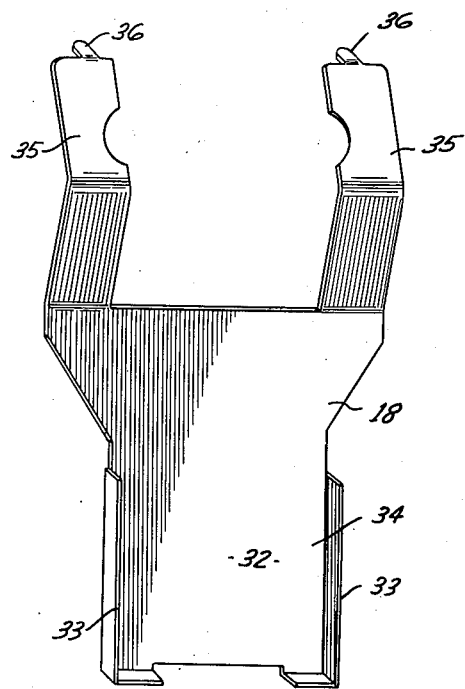
Figure 10:
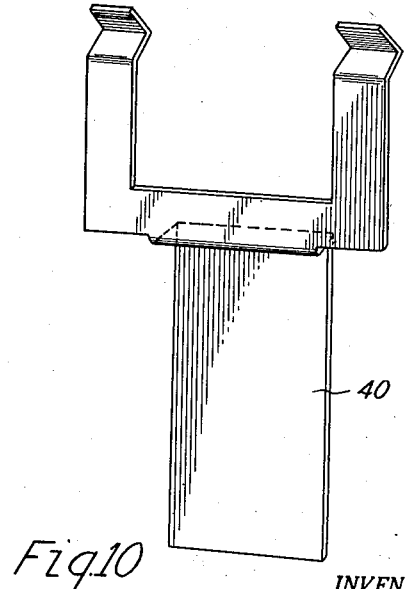

Figure 8 is an enlarged perspective view of the bracket element which is secured to the hot water tank, Figure 9 is an enlarged perspective view of the bracket which engages the casing member for mounting the second thermostatic switch, and Figure 10 is an enlarged perspective view of the modified form of bracket member embodied in the structure illustrated in Figures 5 and 6.

In the mounting of thermostatic controls or switches in operative position with respect to the exterior wall of a hot water tank for controlling the heating elements thereof, it is frequently necessary to employ a special fixture or bracket for supporting the same, for example, adjacent to the heating element or at a point remote therefrom, to obtain the most efficient use of the electric heating current. Numerous types of brackets have been proposed yet most of them are unsatisfactory by reason of limited flexibility and usability with various types of hot water tanks, or because of excessive cost by reason of the complicated nature thereof, or difficulty of installation, or for other reasons. It is therefore, a primary object of my invention to provide a mounting bracket assembly which overcomes the foregoing objections and serves as an effective mounting for one or a plurality of control units on standard or widely used types of hot water tanks.

With reference to the accompanying drawings, there is illustrated a bracket assembly made in accordance with the teachings of the present invention for mounting one or a plurality of thermostatic control devices upon the exterior wall 10 of a hot water tank having a plug member 11 suitably secured within an aperture in the wall 10 by welding as at 12. Secured to the plug 11 by means of a plurality of studs 13 is an electrical heating device 14 provided with a heating element (not shown) which projects into the interior of the water tank and serves to heat the water contained therein. Suitable terminals 15 and 16 projecting outwardly from the device 14 receive the lead in conductors for supplying the electric current to the heating element.

The bracket assembly of the present invention comprises a bracket element 17 which is adapted to be secured to the hot water tank, a casing member 23 engageable by the bracket member 17 and adapted to receive the water heater thermostatic control device A, which is illustrated and described in detail in my co-pending application, Serial No. 123,930, filed October 24, 1949, now Patent No. 2,645,692, and a bracket element 18 which is engaged by the casing 23 and embraces and supports a high limit switch B, described in detail in my United States Patent No. 2,538,080, dated January 16, 1951. The bracket element 17 (Figures 1, 2 and 8) is formed from an elongated trapezoidal blank, the large end being cut away to provide a semi-circular cutaway portion having an edge 19. Extending inwardly from the edge portion 19 are a plurality of spaced slots 20, each terminating in a circular end wall. The slots 20 engage the studs 13 when the bracket element 17 is mounted on the wall of the hot water tank. In the illustrated embodiment it is to be noted that the slots are spaced along the edge portion 19 in greater number than is required so that the bracket element may be adapted for use with the various types of heating devices commonly used in the electric hot water heater industry.

The narrow end of the bracket element 17 is formed with a substantially rectangular cutaway portion 21 thereby forming spaced prong members 22, the outer ends of which are reversely bent to form a substantially V-shaped end portion thereon. As illustrated in Figures 2 and 8 the bifurcated end of the bracket member 17 is bent downwardly out of the plane of the member so that the ends of the prongs 22 will resiliently engage the casing 23.

The casing 23 (Figures 2 and 7) which receives the thermostatic device A includes a rectangular base 24, side walls 25 and end walls 26. To facilitate the mounting of device A within the casing 23, the upper end wall 26 thereof is slotted to receive a lug 27 integrally formed on the body portion of the device A and suitable rivets 28 secure the lower end of the device A within the casing 23. The side walls 25 of the casing 23 are provided with outstanding ears 29 terminating in upstanding flanges which are suitably notched as at 30. The notch 30 is complementary to and receives the V-shaped ends of the prongs 22 formed on the bracket element 17. When assembled the bracket element 17 securely holds the device A upon the tank wall 10 with the rear wall of the device thereof in intimate contact with the wall 10 of the hot water tank so that the thermo element of the device will be responsive to the temperature of the water in the tank.

The body of the bracket element 18 is formed with a rectangular portion 32 provided with upstanding side flanges 33 defining a pocket 34 which slidably receives the lower portion of the casing 23. Above the rectangular portion 32 the body of the bracket element 18 flares outwardly and is formed with spaced arms 35 which are suitably arched and terminate in a plane above the plane of the body portion. The space between the arms 35 is substantially equal to the width of the pocket 34 and receives therein the upper end of the device A securing the same against lateral displacement. The ends of the arms 35 are formed with depending prongs 36 which are adapted to engage within suitable spaced openings 37 formed in the device B.

With reference to Figures 5, 6 and 10 there is illustrated a modified form of bracket element 18 wherein, in place of the enlarged mounting portion, the element 18 is formed with a straight rectangular portion 40. This type of bracket element is used in those installations where a heating element is employed which differs from that shown in Figure 1 or it is desired to install the thermostatic control device on the wall of the water tank at a point remote from the heating element. The portion 40 of the element is maintained in place by means of a band 41 which encircles the tank 10, the ends of the band being held together by means of tension bolts 42.

Having thus described my invention so that those skilled in the art may understand and practice the same, what I desire by Letters Patent is embodied in the appended claims.

I claim:

1. A bracket assembly for a pair of control devices comprising a bracket member having a mounting portion and a bifurcated end portion adapted to embrace one of said control devices, and a second bracket member arranged to receive and to be retained in position by said first device and formed with a bifurcated end portion adapted to embrace the second of said control devices.

2. A bracket assembly for a pair of control devices comprising a bracket member having a mounting portion and a bifurcated end portion adapted to embrace one of said control devices, means for securing the mounting portion of said bracket member to the exterior wall of a hot water tank, and a second bracket member formed with a pocket adapted to receive said first control device and having a bifurcated end portion arranged to support the second of said control devices.

3. A bracket assembly for a pair of control devices comprising a bracket member adapted to embrace one of said control devices, means for securing said bracket member upon the exterior wall of a hot water tank, and a second bracket member engageable with said first control device and formed with a bifurcated end portion arranged to embrace the second of said devices and secure it in operative position upon the wall of the tank.

References Cited in the file of this patent

UNITED STATES PATENTS

| Number | Name | Date |
| --- | --- | --- |
| 2,268,619 | Reid | Jan. 6, 1942 |
| 2,561,474 | Ingels | July 24, 1951 |
| 2,575,150 | Wellman | Nov. 13, 1951 |